(12) United States Patent
Vendrow

(10) Patent No.: US 11,013,042 B1
(45) Date of Patent: May 18, 2021

(54) METHODS AND SYSTEMS FOR ESTABLISHING COMMUNICATIONS

(71) Applicant: RingCentral, Inc., Belmont, CA (US)

(72) Inventor: Vlad Vendrow, Reno, NV (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 17/247,783

(22) Filed: Dec. 22, 2020

(51) Int. Cl.
  *H04W 76/10* (2018.01)
  *H04L 29/08* (2006.01)
  *H04W 4/12* (2009.01)
  *H04W 72/04* (2009.01)

(52) U.S. Cl.
  CPC ........... *H04W 76/10* (2018.02); *H04L 67/141* (2013.01); *H04W 4/12* (2013.01); *H04W 72/04* (2013.01)

(58) Field of Classification Search
  CPC ......... H04L 45/56; H04L 45/74; H04L 51/14; H04L 51/36; H04L 67/141; H04L 65/1069; H04L 65/1006; H04M 15/755; H04M 2203/152; H04M 3/42059; H04M 7/009; H04M 15/00; H04M 1/575; H04W 76/10; H04W 76/11; H04W 4/12
  See application file for complete search history.

(56) References Cited

U.S. PATENT DOCUMENTS

| | | | | |
|---|---|---|---|---|
| 10,572,859 | B1* | 2/2020 | Evans | H04M 3/42068 |
| 10,708,441 | B1* | 7/2020 | Evans | H04M 3/42331 |
| 2011/0292930 | A1* | 12/2011 | Mobin | H04M 7/003 370/352 |
| 2012/0008753 | A1* | 1/2012 | Burnett | H04M 3/53333 379/88.17 |
| 2020/0226552 | A1* | 7/2020 | Evans | G06Q 10/1095 |
| 2021/0011999 | A1* | 1/2021 | Bennett | G06F 16/1734 |

* cited by examiner

*Primary Examiner* — Allahyar Kasraian

(57) ABSTRACT

A computer-implemented method for establishing communications, comprising receiving, from an initiator, an input with a user identifier (ID) to initiate a communication, determining that the user ID is associated with a Unified Communication as a Service (UCaaS) service provider user, providing, to the initiator, a link to a UCaaS service provider platform, and initiating the communication to the user ID using the UCaaS service provider platform.

20 Claims, 6 Drawing Sheets

METHODS AND SYSTEMS FOR ESTABLISHING COMMUNICATIONS

TECHNICAL FIELD

The present disclosure relates generally to the field of establishing communication with a user. Specifically, the present disclosure relates to systems and methods for determining if the user has a subscription to a Unified Communications as a Service (UCaaS) service provider and using a platform of the UCaaS service provider to establish the communication.

BACKGROUND

The use of cellphones and smartphones has become commonplace. Currently, a caller initiates a call just by typing in a phone number or choosing a phone number from a contact list. The phone number is dialed by an application, often that the user chooses. This application can be a built-in dialer that uses a cellular network to establish the telephonic communication. However, no analysis of the phone number is made by the phone or by any part of the cellular network. Consequently, any deficiencies in the communication path or excessive use of resources given these deficiencies are left unaddressed. Moreover, there is little to no intelligence available to determine an intended communication recipient's subscribed service provider. This lack of visibility is present throughout a variety of different types of communication.

SUMMARY

The appended claims may serve as a summary of the invention.

DETAILED DESCRIPTION

Figure 1:
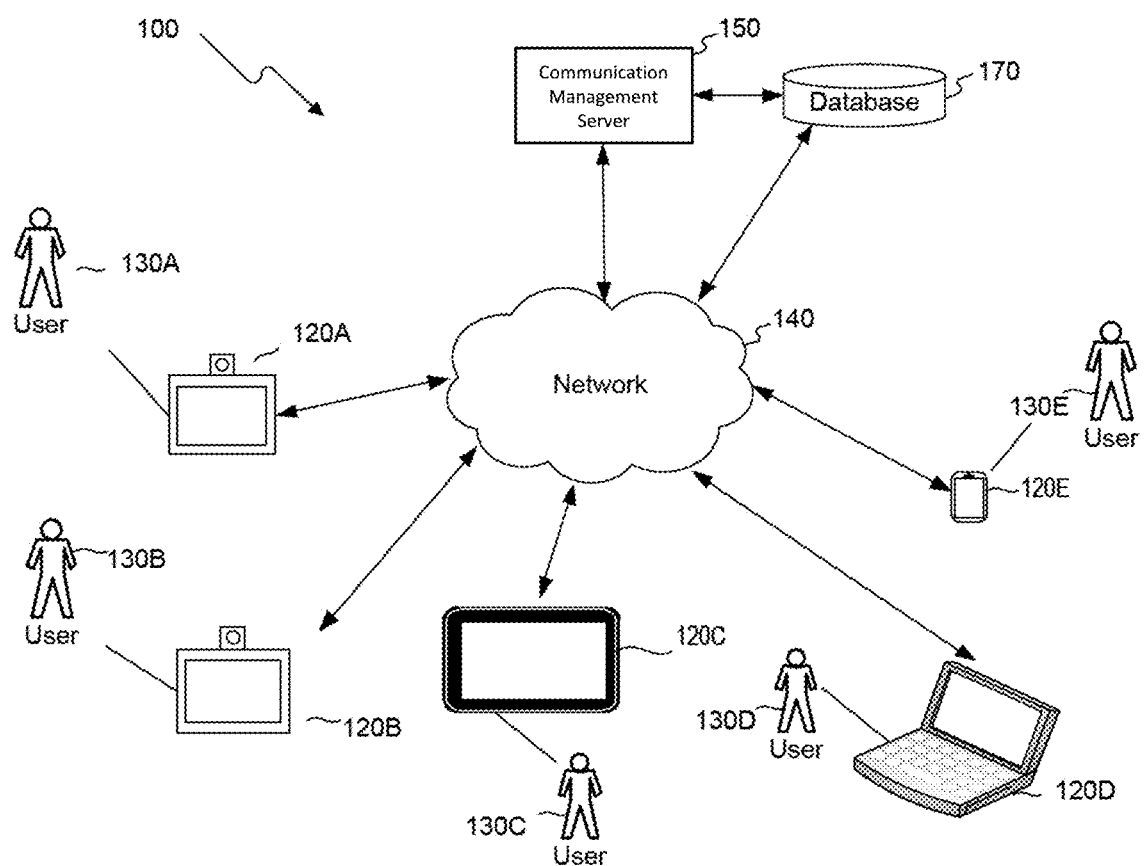
FIG. 1 depicts an example of a notifications management system.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

The embodiments herein include computer-implemented methods, tangible non-transitory computer-readable mediums, and systems. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

The present disclosure relates to computer-implemented methods for establishing communication. The method comprises receiving, from an initiator, an input with a user identifier (ID) to initiate a communication and determining that the user ID is associated with a Unified Communication as a Service (UCaaS) service provider user. The method further comprises providing, to the initiator, a link to a UCaaS service provider platform, and initiating the communication to the user ID using the UCaaS service provider platform.

In some embodiments, a computer-readable medium stores a set of instructions that, when executed by a processor, cause receiving, from an initiator, an input with a user ID to initiate a communication and determining that the user ID is associated with a UCaaS service provider user. The computer-readable medium stores further instructions that, when executed by the processor, further cause providing, to the initiator, a link to a UCaaS service provider platform, and initiating the communication to the user ID using the UCaaS service provider platform.

In some embodiments, a web-based server for establishing communication is provided. The web-based server comprises a memory that stores a set of instructions and at least one processor configured to execute the instructions to cause receiving, from an initiator, an input with a user ID to initiate a communication. The memory stores further instructions that, when executed by the processor, further cause determining that the user ID is associated with a UCaaS service provider user, providing, to the initiator, a link to a UCaaS service provider platform, and initiating the communication to the user ID using the UCaaS service provider platform.

This implementation allows an initiator to utilize all features that the UCaaS service provider offers to its customers. It also reduce extraneous burdens on communication paths and communication cost.

UCaaS is a cloud-delivered unified communications model that supports different communications functions including telephony, messaging, video, conferencing, and any other type of communication. In some embodiments, UCaaS infrastructure is owned, operated, maintained and delivered by a UCaaS service provider. A UCaaS user often utilizes some or all the UCaaS features based on a subscriber model and, consequently, leaves the functionality, stability and maintenance aspects to the service provider. Additionally, UCaaS has more features in a variety of different types of communications compared to legacy providers. For example, UCaaS services provider have advanced calling features that legacy cellular providers do not have.

FIG. 1 shows an example of a communication management system 100 in which various implementations as described herein may be practiced. Communication management system 100 enables a plurality of users to establish different types of communications, for example audio, video or textual. In some examples, one or more components of communication management system 100, such as communication management server 150, can be used to implement computer programs, applications, methods, processes, or other software to perform the described techniques and to realize the structures described herein.

As shown in FIG. 1, communication management system 100 includes one or more user devices 120A-120E (collectively, referred to as user devices 120), a network 140, a communication management server 150, and a database 170. The components and arrangements shown in FIG. 1 are not intended to limit the disclosed embodiments, as the system components used to implement the disclosed processes and features can vary.

The network 140 facilitates different types of communications between user devices 120 (some or all) and the communication management server 150. The network 140 may be any type of networks that provides communications, exchanges information, and/or facilitates the exchange of information between the communication management server 150 and user devices 120. For example, the network 140 may be the Internet, a Local Area Network, a cellular network, a public switched telephone network ("PSTN"), or other suitable connection(s) that enables communication management system 100 to send and receive information between the components of communication management system 100. A network may support a variety of communication formats and may further support a variety of services and applications for user devices 120.

The communication management server 150 can be a computer-based system including computer system components, desktop computers, workstations, tablets, hand-held computing devices, memory devices, and/or internal network(s) connecting the components. The communication management server 150 may be configured to provide communication services, such as audio communications, video communications and textual communications between users 130A-130E. The communication management server 150 may be configured to receive a data from user devices 120 or a database 170 over the network 140, store the data and process the data. For example, the communication management server 150 may be configured to analyze the data obtained from the user devices 120 including data identifying the UCaaS service provider that is providing services. The communication management server 150 can search the data on publicly available resources (e.g. the database 170). The communication management server 150 can determine which UCaaS service provider each of the devices subscribe to and provide an initiator of a communication to one of the devices 120 with a link to an application developed by the UCaaS service provider.

In some implementations, the functionality of the communication management server 150 described in the present disclosure is distributed among one or more of the user devices 120A-120E. For example, one or more of the user devices 120A-120E may perform functions such as determining the UCaaS service provider that the device belongs to.

The database 170 includes one or more physical or virtual storages coupled with the communication management server 150. The database 170 is configured to store the data about users 120, devices 130 and their service providers. For example, the database 170 stores associations between a phone number and a telecommunications provider that the phone number is assigned to. The telecommunications provider can be the UCaaS service provider, in an example embodiment. The database 170 can be a publicly available resource on the Internet, such as the North American Numbering Plan (NANP) web resource, in an example embodiment. The data stored in the database 170 may be transmitted to the communication management server 150 based on a request for the data, such as the phone number, from the communication management server 150. While the database 170 is illustrated as an external device connected to the communication management server 150, the database 170 may also reside within the communication management server 150 as an internal component of the communication management server 150. In this example, the database 170 can store past data received from the devices 120 about the UCaaS service providers that the devices belong to or are subscribed to.

As shown in FIG. 1, users 130A-130E may communicate with communication management server 150 using various types of user devices 120A-120E via network 140. As an example, user devices 120A, 120B, and 120D include a display such as a television, tablet, computer monitor, video conferencing console, or laptop computer screen. User devices 120A, 120B, and 120D may also include video/audio input devices such as a video camera, web camera, or the like. As another example, user devices 120C and 120E include mobile devices such as a tablet or a smartphone having display and video/audio capture capabilities. User devices 120A-120E may also include one or more software applications that facilitate the user devices to engage in communications, such as IM, text messages, EMAIL, VoIP, video conferences, with one another. User devices 120A-120E may have different user identifiers (IDs), for example the User device 120A may have an Internet Protocol (IP) address as the user ID, the User device 120E may have phone number as the user ID and the User device 120D may have an email address as the user ID.

Figure 2:
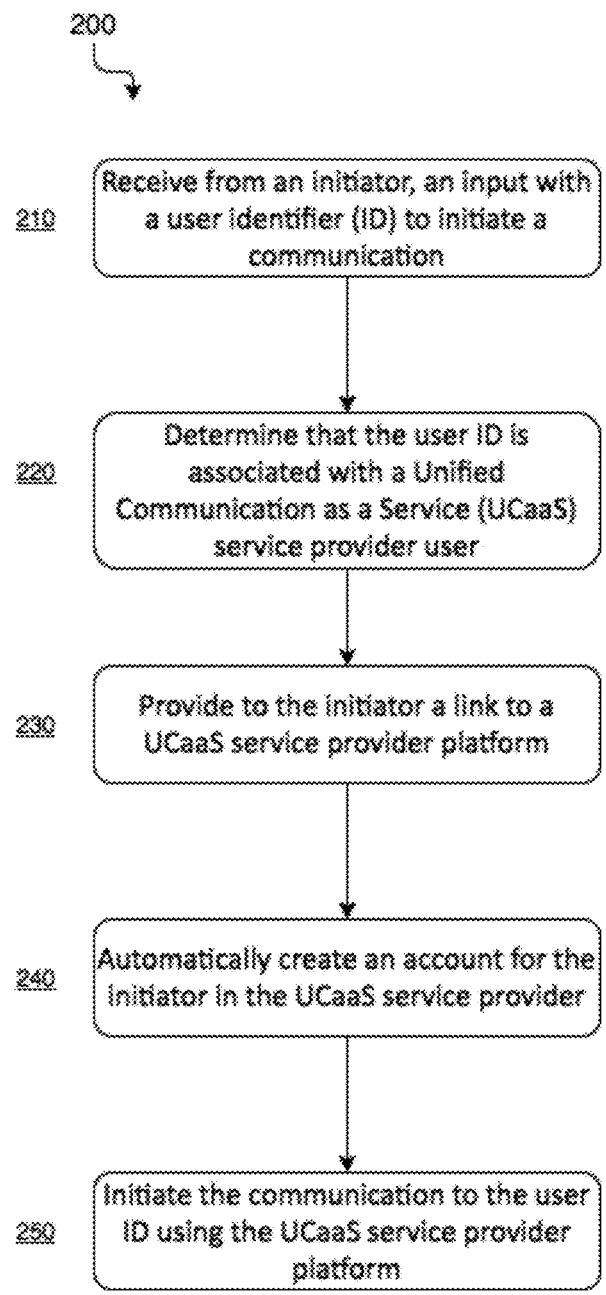
FIG. 2 depicts an example of a flow chart for initiating a communication to a user.

FIG. 2 shows an example of a flow chart 200 for initiating a communication to a user. At step 210, an input with a user identifier (ID) is received from an initiator to initiate the communication. For example, the initiator (e.g., User 130A) wants to initiate the communication (e.g., place a call) to a user (e.g., User 130E). User 130A uses his User device 120A and types the user identifier (ID) of a User device 120E associated with the User 130E. The user ID, in this case, is a phone number associated with the User device 120E. In another embodiment the User 130A can choose the user ID from a contact list, or copy and paste it from publicly available resources, such as from an Internet search result. It should be understood that for User devices 120A, 120B, 120C, and 120D, other user IDs can be applied or associated with each device. For example, for User device 120A, an email address can be applied as the user ID, for User device 120D, an Internet Protocol (IP) address can be applied as the user ID, and so forth. The initiator can type, paste or choose, in an appropriate field, any user IDs using the device that the initiator uses to establish the communication. The communication management server 150 receives this user ID from the initiator's User device 120A.

In some embodiments, the initiator and the initiator's associated device is not a current subscriber of the UCaaS service provider's services. For example the initiator can use a cellular network to initiate calls through cell phone carriers. In another embodiment, the initiator is outside the UCaaS service provider network (e.g. the network 140), or the initiator is subscribed to another UCaaS service provider.

At step 220, a communication management server 150 determines if the user ID received from the initiator is associated with a UCaaS service provider. The communication management server 150 obtains information from the User device 120E to which the communication will be established. In an embodiment, the information identifies a service provider that the user device's associated user ID belongs to or subscribes to. This can be done prior to establishing the communication or in the beginning of establishing the communication. In other embodiments, the communication server 150 can search for information that identifies the user ID using publicly available resources. For example, a database 170 is a publicly available NANP database with information about phone numbers and associated owners or users of these phone numbers. In this example, the communication management server 150 requests the information about the phone number associated with the User device 120E from the database 170 and receives a reply that the phone number belongs to a phone number pool belonging to Company XYZ. The communication management server 150 determines based on the information received from NANP database that Company XYZ is leading UCaaS service provider. In another embodiment, the communication management server 150 can search the Internet for information about Company XYZ and determine what type of company it is, what technology area the company is in, or any other information about the company. Additionally, the communication management server 150 can locate a downloadable application or web portal that the UCaaS service provider offers to its customers.

In some embodiments, the communication management server 150 also determines whether the initiator or the initiator's associated device subscribes to the UCaaS service provider's service. The communication management server 150 uses any information related to the intiator, such as a phone number, email address, IP address, or any other information, and cross-references the initiator's information with information stored in a database 170 in association with the UCaaS service provider. In some embodiments, if the initiator not an existing UCaaS subscriber, then the method proceeds to step 230. In some embodiments, if the initiator is determined to be an existing subscriber to the UCaaS service provider's services, then no additional steps are taken. In other embodiments, if the initiator is determined to be an existing subscribe, the method continues at step 230 with the linked information adjusted to provide a current or most updated downloadable application or web-based portal, as further described herein.

At step 230, the communication management server 150 provides a link to the UCaaS service provider platform. The UCaaS service provider platform is a downloadable application that the UCaaS service provider offers to its customers or a web-based portal that its customers use for communications. The communication management server 150 provides the link to the UCaaS service provider platform using known services such as Short Message Service (SMS), push notifications or Multimedia Message Service (MMS) and cause the link to be displayed on the initiator's user device, for example the User device 120A. The initiator, after receiving the link to the UCaaS service provider platform, downloads the application that the UCaaS service provider offers to its customers. After downloading, the application is automatically installed on the initiator's device (e.g. the User device 120A). In another embodiment, the link to the UCaaS service provider platform can route to a web-based portal that the UCaaS service provider's customers use for communications. The web-based portal can be opened using any appropriate application installed on the initiator's device, such as mobile web browser.

In another embodiment, when an MMS service is used to provide the link to the UCaaS service provider platform, a tutorial can be included in an MMS message on how to operate the UCaaS service provider platform. The tutorial may be in the form of a video file, audio file, image file, or any other media.

It should be understood that, in some embodiments, the link to the UCaaS service provider platform is provided to the initiator and/or the initiator's associated device if the initiator is not subscribed to the same UCaaS service provider as the User associated with the User ID. The initiator may not be a subscriber of UCaaS service providers at all, communicating using land lines or cellular networks, for example. The initiator may also initiate a communication, such as an email message, using a network that is not the UCaaS service provider's network, or the initiator can be subscribed to another UCaaS service provider. If the initiator is subscribed to the same UCaaS service provider as the User associated with the User ID, no link is sent, in some embodiments. In other embodiments, a link to a current or most updated communication application or web-portal is provided.

At step 240, an account for the initiator is automatically created in the UCaaS service provider platform. The account can be generated, for example, if the communication management server 150 determines that the initiator is not a subscriber to the UCaaS service provider's services or does not have an existing account with the UCaaS service provider. The communication management server 150, after providing the platform link to the User device 120A associated with the initiator (User 130A), sends a request to the UCaaS service provider with the initiator or User 120A credentials to create an account with the UCaaS service provider. The communication management server 150 can send a request to create the account on the UCaaS service provider platform using just a user ID of the initiator, which may be auto-generated in some embodiments. In another embodiment, the communication management server 150 can request additional information such as the name of the initiator, an address of the initiator, or another user ID of the initiator. The communication management server 150 uses this additional information to request the creation of the account with the UCaaS service provider for the initiator. After the UCaaS service provider creates the account for the initiator, the communication management server 150 delivers account information to the initiator or User 130A and optionally stores the account information on the associated User device 120A for automatic login when the application is opened or the User 130A accesses the UCaaS service provider's web-based portal.

At step 250, a communication that is directed to a specific user ID, such as the phone number of the User device 120E associated with the User 130E, is initiated using the UCaaS service provider platform. In one embodiment, the communication is initiated using the application that was downloaded at step 230 and automatically launched on the User device 120E after downloading is completed. The user ID received from the initiator at the step 210 is utilized by the application to initiate and establish the communication.

In another embodiment, the communication is initiated using the UCaaS service provider's web-based portal where the UCaaS service provider platform customers can communicate using different types of communication including audio, video, text, or any other type of communication. The web-based portal can be launched through a mobile web browser installed on the User device 120A, for example.

It should be understood that all steps described in FIG. 2 can be done not only by communication management server 150 but also by the User devices 120. All steps of the flow chart 200 can be executed by a processor of the User device 120. For example, the User device 120A can determine that the user ID belongs to the UCaaS service provider Company XYZ by searching the NANP database. After determining that the UCaaS service provider is Company XYZ, the User device 120A can search for the application that Company XYZ customers use to communicate and download and launch it. In the alternative, the User device 120A can search for the web-based portal that Company XYZ provides to its customers for communication using different types of communication. Then the User device 120A can create the account for the User 130A in the web-based portal using information that is stored on the User device 120A, such as a full name, an address, an alternative user ID, or any other information pertaining to the User 130A.

In another embodiment, before executing step 230, the communication management server 150 can display a notification on the User device 120A for User 130A with the option to accept or reject utilizing the native application or web-based portal for the UCaaS service provider. If the User 130A accepts the option on the User device 120A, the method will proceed with step 230. If the User 130A rejects the option on the User device 120A, the method will proceed with regular communication. In the example of a User 120A who tries to establish a communication using the phone number associated with the User device 130E, rejection of the option will initiate a cellular phone call to the User device 120E without accessing the UCaaS application or web-based portal.

In some embodiments, the communication management server 150 is a component of the UCaaS service provider. In some embodiments, the communication management server 150 determines if a user ID of a communications initiator or caller is associated with a UCaaS service provider using the techniques described above. If the User ID of the caller is not associated with the UCaaS service provider, the conference management server 150 sends a notification to the caller's device with a link to the UCaaS service provider platform that the communication management server 150 is a part of.

In some embodiments, the communication management server 150 can automatically create a user account with the UCaaS service provider for the initiator or caller, while simultaneously sending a link to the UCaaS service provider platform, such as via an SMS message. The user account may be created using known information, such as an initiator's or caller's User ID (e.g. a phone number) and/or a name if the User ID is stored in association with the name in the device of a communications recipient or callee. The user account may also be created using any other information obtained from an initiator's or caller's device or from publicly available resources. In some embodiments, upon generating the user account, the account credentials are provided to the caller, for example, via an SMS message.

In another embodiment, the communication management server 150 generates options and provides them to the initiator or caller in the form of a notification. The notifications may be sent via an SMS message, MMS message, or any other form of communication. For example, the communication management server 150 may generate an options notification inquiring whether the initiator or caller wants to proceed with the UCaaS service provider platform or with a cellular call. The options notification may be sent to the device associated with the initiator or caller. In some embodiments, if the initiator or caller selects the option to proceed with the UCaaS service provider's platform, then a user account is generated. In some embodiments, if the initiator or caller selects the option to proceed with the cellular call rather than the UCaaS platform, a user account for the platform may still be generated but kept inactive for future use. In this scenario, if the initiator or caller initiates yet another call, the communication management server 150 may generate and send another notification providing the initiator with the option to use the UCaaS platform. In some embodiments, this subsequent notification includes information about the inactive user account, such as account credentials, for easy access should the initiator choose to use the UCaaS platform.

In yet another embodiment, the communication management server 150, after determining that the initiator's or caller's User ID is not associated with the UCaaS service provider, automatically creates a temporary audio or video conference session for the callee and the caller. The communication management server 150 routes the callee and the caller to the newly initiated audio or video conference session while providing the caller with information about features of the UCaaS service provider platform in the same manner as previously described herein.

It should be understood that all steps described above are applicable for all types of communications intented for the subscriber of the UCaaS service provider. For instances, while the above example relates to a call, the steps may be applied to a chat, a video conference, or any other types of communications.

Figure 3:
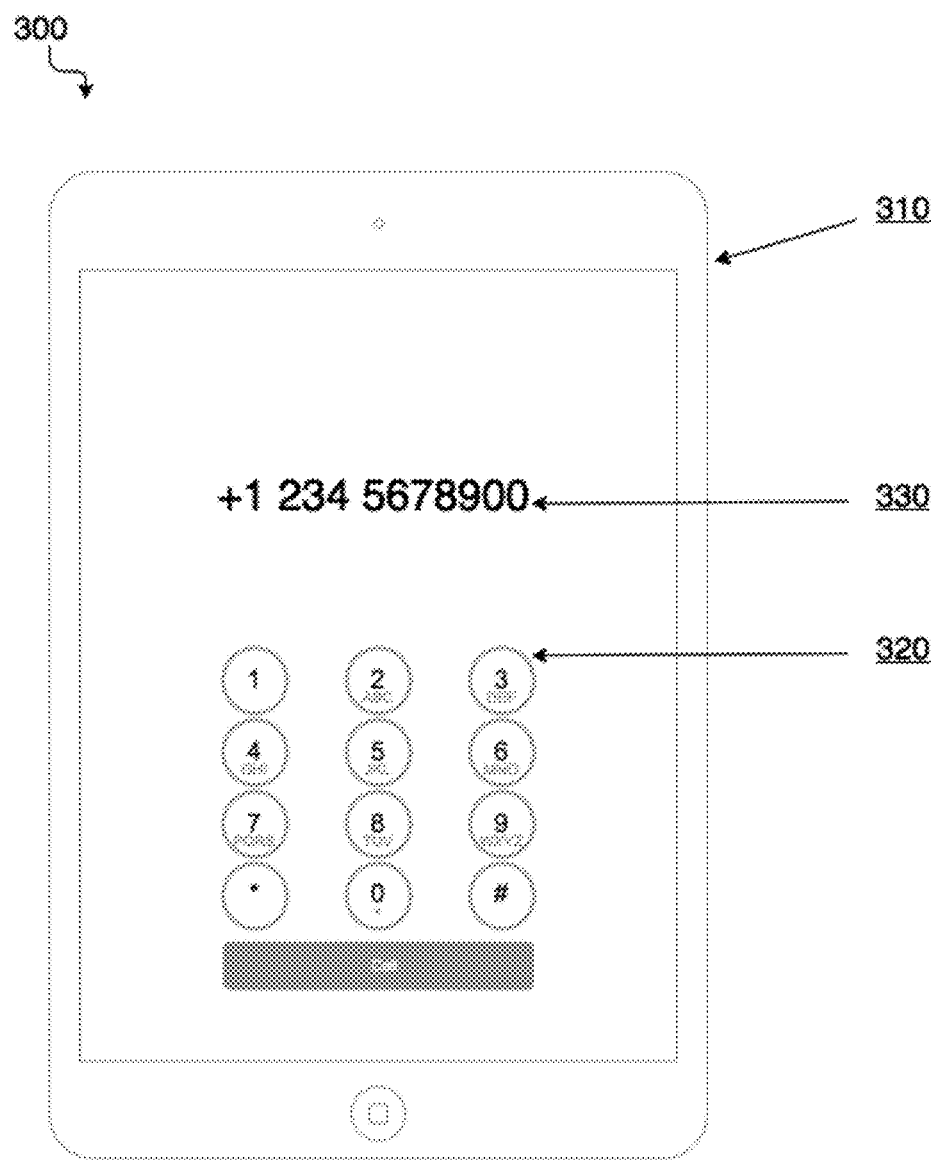
FIG. 3 depicts an example of a User Interface of a user device.

FIG. 3 shows an example of a User Interface (UI) 300 of a User device 310, such as User device 120A. The User device 120A, which is associated with a User 130A, is a tablet computer with cellular and Internet connection, in an example embodiment. As was described above in an example embodiment, the User 130A wants to initiate a communication, such as placing a call through a cellular network, using the User device 120A. The User 130A types a user ID 330 (i.e. a phone number of a User device 120E associated with a User 130E) using controls 320 of the User device 120A. In another embodiment, the User 130A can chose the user ID from a contact list of the User device 120A.

Figure 4:
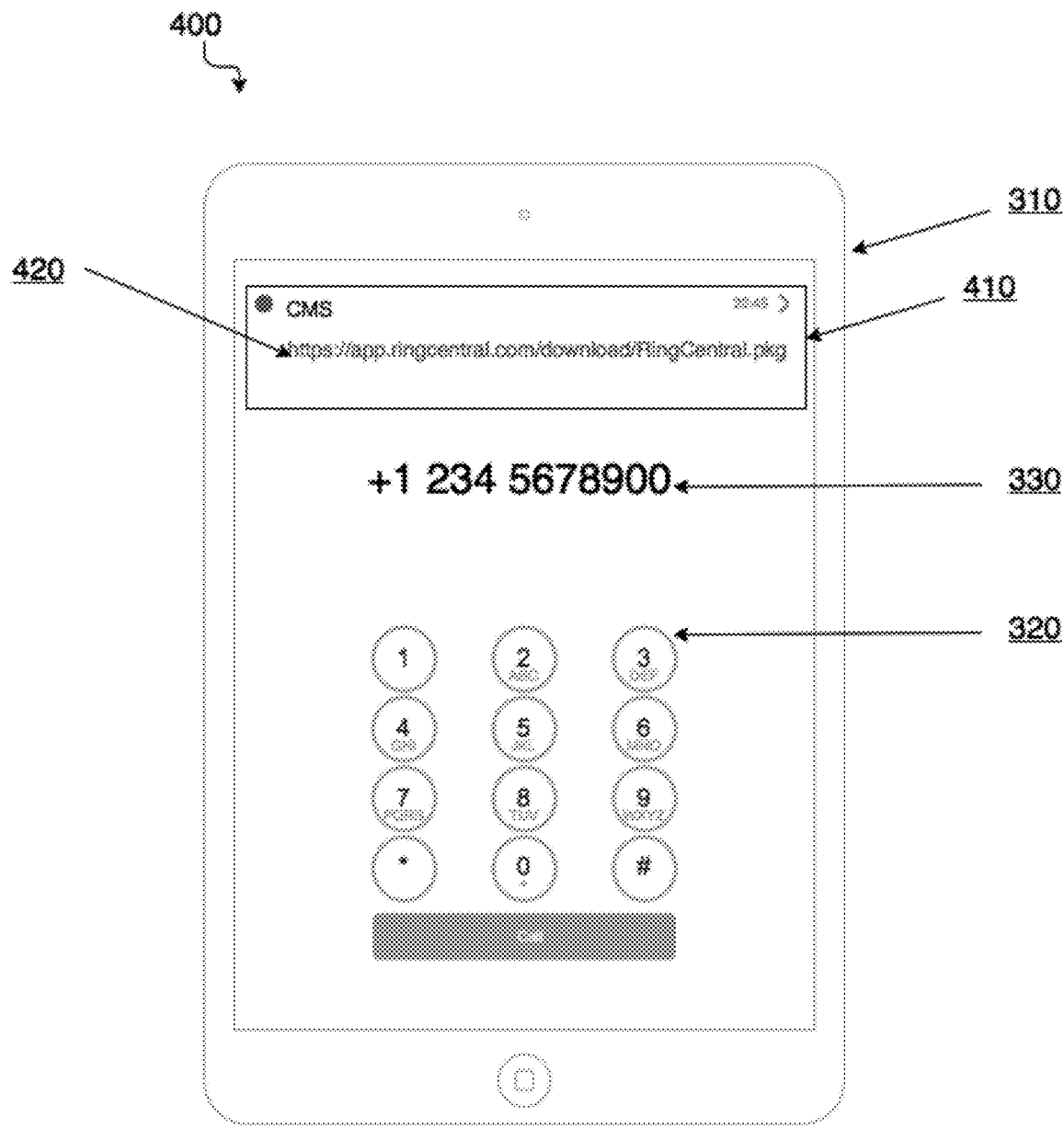
FIG. 4 depicts an example of a User Interface of a user device.

FIG. 4 shows an example of a UI 400 of a User device 310 at step 220. At the step 220, the communication management server 150 determines that the user ID 330 belongs to a UCaaS service provider—Company XYZ—and locates where the UCaaS service provider's platform (e.g. Company XYZ's software application) can be downloaded from. The communication management server (CMS) 150 sends an SMS message 410 to the User device 120A with a link 420 to the UCaaS service provider platform.

In another embodiment, the Company XYZ application can be downloaded automatically after receiving the link on the User device 120A.

In yet another embodiment, the communication management server 150 can use another type of notification to provide the link to the User device 120A, such as push notifications, MMS messages, or any other type of notification.

In another embodiment, the link to a web-based portal can be provided. The web-based portal can be opened through an installed mobile web browser, for example.

Figure 5:
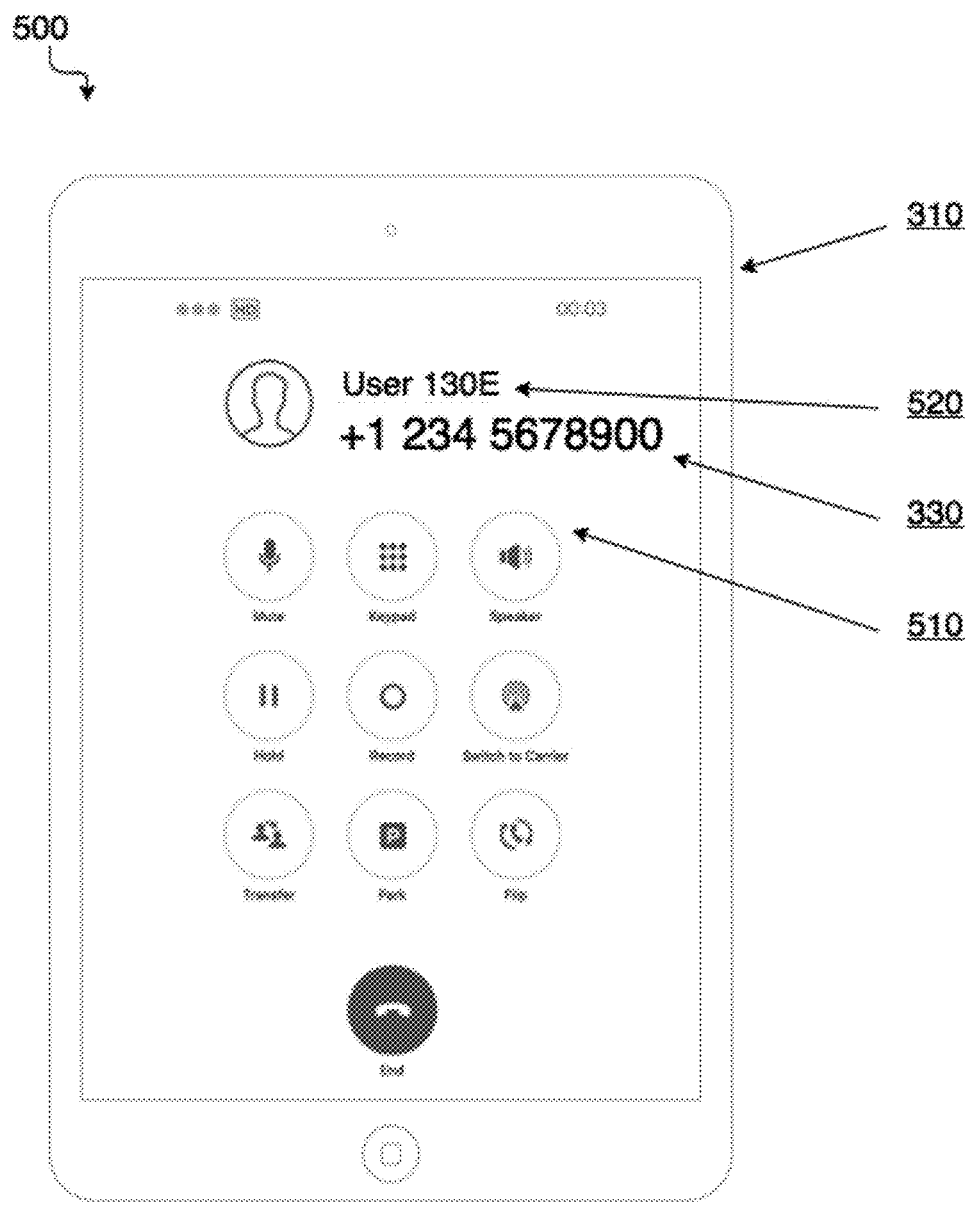
FIG. 5 depicts an example of a User Interface of a user device.

FIG. 5 shows an example of a UI of a User device 310 at step 250. A communication is sent to user ID 330 using the UCaaS service provider platform, such as the application provided by Company XYZ. Establishing the communication with the application provides the User 120A with enhanced controls 510 that are not available using the cellular network but are available for users of the UCaaS service provider. In this example, enhanced controls 510 include a series of controls, such as "hold," "record," "flip,"

"park," "transfer," and/or any other controls. Additionally, using the UCaaS service provider brings shared user information across all users. Consequently, the User 130A can see not only the user ID 330 but additionally a name of a user associated with this user ID provided by the UCaaS service provider, even if the phone number is not saved as a contact on the User device 120A. In this case, the User 130A sees the name 520 "User 130E" in addition to the phone number. In another embodiment, different types of enhanced information can be shown to the User 130A through the User device 120A based on a rules set by the UCaaS service provider. The different types of enhanced information may include, for example, an address, an email, a location, or any other type of information.

It should be understood that any the flow chart shown in FIG. 2 can be applied to different types of communication and different user IDs. For example, an initiator (e.g. a User 130B) wants to write a text message in a third party message application (e.g. WhatsApp) to a User 130C using his email address as a user ID. In this case, the communication management server 150 can determine that the email address belongs to a customer of the UCaaS service provider and provide to the User 130B with a link to the UCaaS service provider's platform using a push notification. The link allows the User 130B to download the UCaaS service provider platform or visit web-based version of the UCaaS service provider platform and communicate with the User 130C using all the functions and features of the UCaaS service provider platform.

In another example a User 130C wants to initiate a video communication with a User 130D using an IP address of a User device 120D as the user ID. The communication management server 150 can determine that the IP address belongs to a customer of a UCaaS service provider and provide a link to the UCaaS service provider platform using an email message to the User 130C. The provided link allows User 130C to download an application that customers of the UCaaS service provider use, thereby allowing User 130C to utilize all the features of the application.

Figure 6:
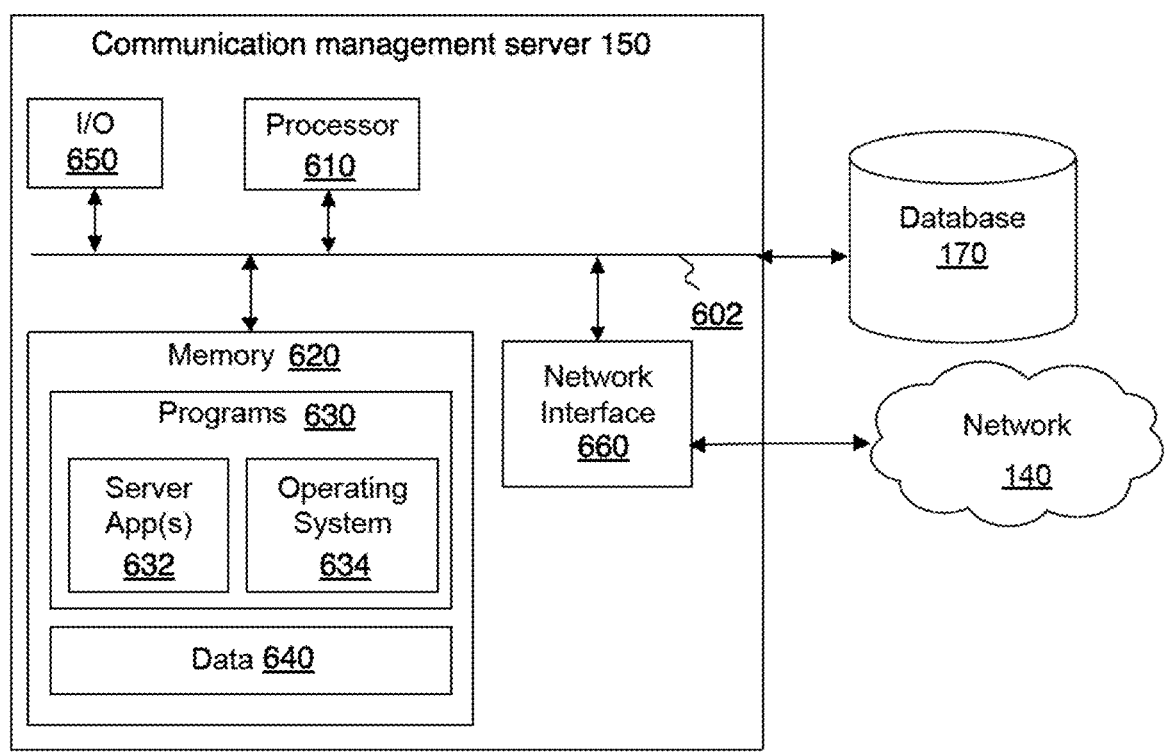
FIG. 6 depicts an example of a communication management server.

FIG. 6 shows a diagram of an example communication management server 150, consistent with the disclosed embodiments. The communication management server 150 includes a bus 602 (or other communication mechanism) which interconnects subsystems or components for transferring information within the communication management server 150. As shown, the communication management server 150 includes one or more processors 610, input/output ("I/O") devices 650, network interface 660 (e.g., a modem, Ethernet card, or any other interface configured to exchange data with the network 140), and one or more memories 620 storing programs 630 including, for example, server app(s) 632, operating system 634, and data 640, and can communicate with an external database 170 (which, for some embodiments, may be included within the communication management server 150). The communication management server 150 may be a single server or may be configured as a distributed computer system including multiple servers, server farms, clouds, or computers that interoperate to perform one or more of the processes and functionalities associated with the disclosed embodiments.

The processor 610 may be one or more processing devices configured to perform functions of the disclosed methods, such as a microprocessor manufactured by Intel™ or manufactured by AMD™. The processor 610 may comprise a single core or multiple core processors executing parallel processes simultaneously. For example, the processor 610 may be a single core processor configured with virtual processing technologies. In certain embodiments, the processor 610 may use logical processors to simultaneously execute and control multiple processes. The processor 610 may implement virtual machine technologies, or other technologies to provide the ability to execute, control, run, manipulate, store, etc. multiple software processes, applications, programs, etc. In some embodiments, the processor 610 may include a multiple-core processor arrangement (e.g., dual, quad core, etc.) configured to provide parallel processing functionalities to allow the communication management server 150 to execute multiple processes simultaneously. It is appreciated that other types of processor arrangements could be implemented that provide for the capabilities disclosed herein.

The memory 620 may be a volatile or non-volatile, magnetic, semiconductor, tape, optical, removable, non-removable, or other type of storage device or tangible or non-transitory computer-readable medium that stores one or more program(s) 630 such as server apps 632 and operating system 634, and data 640. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The communication management server 150 may include one or more storage devices configured to store information used by processor 610 (or other components) to perform certain functions related to the disclosed embodiments. For example, the communication management server 150 may include memory 620 that includes instructions to enable the processor 610 to execute one or more applications, such as server apps 632, operating system 634, and any other type of application or software known to be available on computer systems. Alternatively or additionally, the instructions, application programs, etc. may be stored in an external database 170 (which can also be internal to the communication management server 150) or external storage communicatively coupled with the communication management server 150 (not shown), such as one or more database or memory accessible over the network 140.

The database 170 or other external storage may be a volatile or non-volatile, magnetic, semiconductor, tape, optical, removable, non-removable, or other type of storage device or tangible or non-transitory computer-readable medium. The memory 620 and database 170 may include one or more memory devices that store data and instructions used to perform one or more features of the disclosed embodiments. The memory 620 and database 170 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, the communication management server 150 may be communicatively connected to one or more remote memory devices (e.g., remote databases (not shown)) through network 140 or a different network. The remote memory devices can be configured to store information that the communication management server 150 can access and/or manage. By way of example, the remote memory devices could be document management systems, Microsoft SQL database, SharePoint databases, Oracle™ databases, Sybase™ databases, or other relational databases.

Systems and methods consistent with disclosed embodiments, however, are not limited to separate databases or even to the use of a database.

The programs 630 include one or more software modules configured to cause processor 610 to perform one or more functions consistent with the disclosed embodiments. Moreover, the processor 610 may execute one or more programs located remotely from one or more components of the communication management system 100. For example, the communication management server 150 may access one or more remote programs that, when executed, perform functions related to disclosed embodiments.

In the presently described embodiment, server app(s) 632 causes the processor 610 to perform one or more functions of the disclosed methods. For example, the server app(s) 632 cause the processor 610 to receive from an initiator an input with a user ID, determine that the user ID belongs to a UCaaS service provider and search an information about a UCaaS service provider platform to provide the initiator with a link to the UCaaS service provider platform. In some embodiments, other components of the communication management system 100 may be configured to perform one or more functions of the disclosed methods. For example, user devices 120A-120E may be configured to determine that the user ID belongs to a UCaaS service provider and search for information about a UCaaS service provider platform to provide the initiator with a link to the UCaaS service provider platform.

In some embodiments, the program(s) 630 may include the operating system 634 performing operating system functions when executed by one or more processors such as the processor 610. By way of example, the operating system 634 may include Microsoft Windows™, Unix™, Linux™, Apple™ operating systems, Personal Digital Assistant (PDA) type operating systems, such as Apple iOS, Google Android, Blackberry OS, or other types of operating systems. Accordingly, disclosed embodiments may operate and function with computer systems running any type of operating system 634. The communication management server 150 may also include software that, when executed by a processor, provides communications with the network 140 through the network interface 660 and/or a direct connection to one or more user devices 120A-120E.

In some embodiments, the data 640 may include the user ID received from the initiator, information about the UCaaS service provider that the user ID belongs to, the link to the UCaaS service provider platform, or any other types of data 640.

The communication management server 150 may also include one or more I/O devices 650 having one or more interfaces for receiving signals or input from devices and providing signals or output to one or more devices that allow data to be received and/or transmitted by the communication management server 150. For example, the communication management server 150 may include interface components for interfacing with one or more input devices, such as one or more keyboards, mouse devices, and the like, that enable the communication management server 150 to receive input from an operator or administrator (not shown).

What is claimed is:

1. A computer-implemented method for establishing communications, comprising:
   receiving, from an initiator, an input with a user identifier (ID) to initiate a communication;
   determining that the user ID is associated with a Unified Communication as a Service (UCaaS) service provider user;
   providing, to the initiator, a link to a UCaaS service provider platform; and
   initiating the communication to the user ID using the UCaaS service provider platform.

2. The method of claim 1, wherein the user ID is a phone number, an email address, or an Internet Protocol (IP) address.

3. The method of claim 1, wherein providing the link to the UCaaS service provider platform comprises sending the link using a Short Message Service (SMS) message, a push notification, a Multimedia Messaging System (MMS) message, or an email message.

4. The method of claim 1, wherein determining that the user ID is associated with a UCaaS service provider user comprises searching on a publicly available resource or retrieving a data from the UCaaS service platform.

5. The method of claim 1, wherein the link to the UCaaS service provider platform routes to a downloadable application.

6. The method of claim 5, further comprising automatically establishing the communication after a download of the downloadable application is completed.

7. The method of claim 1, wherein the link to the UCaaS service provider platform routes to a web-based application.

8. A system for establishing communications, comprising:
   a memory storing a set of instructions; and
   at least one processor configured to execute the instructions to:
   receive, from an initiator, an input with a user identifier (ID) to initiate a communication;
   determine that the user ID is associated with a Unified Communication as a Service (UCaaS) service provider user;
   provide, to the initiator, a link to a UCaaS service provider platform; and
   initiate the communication to the user ID using the UCaaS service provider platform.

9. The system of claim 8 wherein the user ID is a phone number, an email address, an Internet Protocol (IP) address.

10. The system of claim 8 wherein providing the link to the UCaaS service provider platform comprises sending the link using a Short Message Service (SMS) message, a push notification, a Multimedia Messaging System (MMS) message, an email message.

11. The system of claim 8 wherein determining that the user ID is associated with a UCaaS service provider user comprises searching on a publicly available resources or retrieving a data from the UCaaS service platform.

12. The system of claim 8 wherein the link to the UCaaS service provider platform routes to a downloadable application.

13. The system of claim 12 further comprising automatically establishing the communication after a download of the downloadable application is completed.

14. The system of claim 8 wherein the link to the UCaaS service provider platform routes to a web-based application.

15. A web-based server for establishing communications, comprising:
   a memory storing a set of instructions; and
   at least one processor configured to execute the instructions to:
   receive, from an initiator, an input with a user identifier (ID) to initiate a communication;
   determine that the user ID is associated with a Unified Communication as a Service (UCaaS) service provider user;

provide, to the initiator, a link to a UCaaS service provider platform; and initiate the communication to the user ID using the UCaaS service provider platform.

16. The web-based server of claim 15 wherein the user ID is a phone number, an email address, an Internet Protocol (IP) address.

17. The web-based server of claim 15 wherein providing the link to the UCaaS service provider platform comprises sending the link a Short Message Service (SMS) message, a push notification, a Multimedia Messaging System (MMS) message or an email message.

18. The web-based server of claim 15 wherein determining that the user ID is associated with a UCaaS service provider user comprises searching on a publicly available resources or retrieving a data from the UCaaS service platform.

19. The web-based server of claim 15 wherein the link to the UCaaS service provider platform can route to a downloadable application or to a web-based application.

20. The web-based server of claim 19 further comprising automatically establishing the communication after a download of the downloadable application is completed.

* * * * *